United States Patent
Palmer et al.

(10) Patent No.: US 8,118,482 B2
(45) Date of Patent: Feb. 21, 2012

(54) SYSTEM FOR CHANGING FLUID TEMPERATURE AND METHOD FOR CONTROLLING SUCH A SYSTEM

(75) Inventors: Tim Palmer, Cambs (GB); Paul Winter, Suffolk (GB)

(73) Assignee: Nestec S.A, Vevey (CH)

( * ) Notice: Subject to any disclaimer, the term of this patent is extended or adjusted under 35 U.S.C. 154(b) by 505 days.

(21) Appl. No.: 12/360,603

(22) Filed: Jan. 27, 2009

(65) Prior Publication Data

US 2009/0192748 A1      Jul. 30, 2009

(30) Foreign Application Priority Data

Jan. 29, 2008   (EP) ..................... 08150779

(51) Int. Cl.
*F24H 9/20* (2006.01)
*F24H 1/10* (2006.01)
*G05D 23/19* (2006.01)

(52) U.S. Cl. ................ 374/147; 374/137; 374/166

(58) Field of Classification Search ............ 374/29, 374/4, 5, 107, 110, 112, 115, 137, 141, 147, 374/148, 163, 166; 219/492, 494, 497; 392/478, 392/485, 488, 489
See application file for complete search history.

(56) References Cited

U.S. PATENT DOCUMENTS

| | | | |
|---|---|---|---|
| 4,695,052 A * | 9/1987 | Berkhof | 237/8 R |
| 5,504,306 A * | 4/1996 | Russell et al. | 219/497 |
| 6,539,173 B2 | 3/2003 | Chu | |
| 6,854,881 B2 * | 2/2005 | Nada | 374/169 |
| 7,945,146 B2 * | 5/2011 | Cabrera | 392/466 |
| 2005/0155364 A1 * | 7/2005 | Concha et al. | 62/181 |
| 2011/0135289 A1 * | 6/2011 | Kayser | 392/449 |

FOREIGN PATENT DOCUMENTS

| | | |
|---|---|---|
| DE | 19531134 | 2/1997 |
| EP | 0654724 | 5/1995 |
| JP | 59056040 A * | 3/1984 |
| JP | 05018605 A * | 1/1993 |
| JP | 07167495 A * | 7/1995 |
| JP | 2004069667 A * | 3/2004 |
| WO | 9304421 | 3/1993 |
| WO | 9938356 | 7/1999 |
| WO | 2004034742 | 4/2004 |

OTHER PUBLICATIONS

European Search Report dated Jul. 16, 2008, 7 pgs.

* cited by examiner

*Primary Examiner* — R. A. Smith
(74) *Attorney, Agent, or Firm* — K&L Gates LLP

(57) ABSTRACT

A system for changing the temperature ($T_1$) of a fluid such as an on-demand water heater is disclosed. The system comprises an input for receiving the fluid (120) at a first temperature ($T_1$) and an output for delivering the fluid at a second temperature ($T_2$). A conduit connects the input to the output, and comprising means such as a heating element for altering the temperature of the fluid from the first temperature ($T_1$) to the second temperature ($T_2$). The system is characterized by the presence of one or more virtual sensors for estimating the fluid temperature in a given location within the conduit. The system provides accurate fluid temperature control without suffering from the slow responsiveness that usually mars sensor-based systems.

32 Claims, 2 Drawing Sheets

SYSTEM FOR CHANGING FLUID TEMPERATURE AND METHOD FOR CONTROLLING SUCH A SYSTEM

BACKGROUND

The present invention relates to a system for changing the temperature of a fluid, comprising an input for receiving the fluid at a first temperature; an output for delivering the fluid at a second temperature; and a conduit for transporting the fluid from the input to the output, the conduit comprising means for altering the temperature of the fluid from the first temperature to the second temperature.

The present invention further relates to a method for controlling such a system.

SUMMARY

Systems for changing the temperature of a fluid such as on-demand water coolers and water heaters typically rely on some sort of feedback from the system to ensure that the desired output temperature of the fluid is reached. To this end, such systems typically comprise one or more temperature sensors that measure the temperature of the fluid in the system and use the sensor readings to control the temperature adjustment means of the system, such as a heating element or a cooling element. Examples of on-demand water heaters are given in U.S. Pat. No. 6,539,173 and its referenced citations.

A known problem with the use of such sensors is the relatively slow responsiveness of the sensor to changes in the fluid temperature. The slow responsiveness is typically caused by the thermal mass of the sensor, and may be more pronounced when the sensor is not in direct contact with the fluid. Such thermal lag typically causes a discrepancy in the temperature measured by the sensor and the actual temperature of the fluid, especially when the fluid temperature is subject to rapid changes. Consequently, a discrepancy may occur between the desired and actual output temperature of the fluid.

One way of solving this problem is to compensate the sensor readings for thermal lag. However, such compensation is not trivial because it is a function of multiple system-variable parameters such as the fluid flow rate through the system, which makes it difficult to accurately compensate for thermal sensor lag.

PCT patent application WO 93/04421 A discloses an ohmic heating process in which liquid food is pumped from an inlet to an outlet past electrodes that receive AC power to heat the liquid, and the outlet temperature is controlled within a predetermined range using a microprocessor that operates a power supply controller. The processor considers the liquid between the electrodes to comprise a series of elements moving from the inlet to the outlet and predicts the outlet temperature that will occur for each of the elements upon reaching the outlet. The power level applied to the electrodes is adjusted if any of the predicted outlet temperatures for the elements falls outside of a predetermined range.

A drawback of this approach is that it is assumed that a unit power applied to the electrodes increases the temperature of a unit volume of the liquid by an empirically determined amount. This has found to be inaccurate. Moreover, the temperature of each element is considered constant throughout the element. This further prohibits accurate temperature estimation for each point between the inlet and outlet.

The present invention seeks to provide a system for changing the temperature of a fluid that does not significantly suffer from thermal lag.

The present invention further seeks to provide a method for controlling such a system.

According to a first aspect of the present invention, there is provided a system for changing the temperature of a fluid, comprising an input for receiving the fluid at a first temperature; an output for delivering the fluid at a second temperature; a conduit for transporting the fluid from the input to the output, the conduit comprising means for altering the temperature of the fluid from the first temperature to the second temperature; a processor comprising a temperature estimating program for estimating the fluid temperature in a selected location of the conduit based on an estimate of the heat transfer between the fluid and the conduit; and a controller for providing a control signal to the temperature altering means in response to the estimated fluid temperature.

The virtual sensor of the present invention, i.e. the program running on the processor of the system of the present invention, may be implemented using a heat transfer model that can be implemented using different levels of complexity. This has the advantage that more fine-grained and more accurate temperature estimates can be obtained. For instance, the program may comprise a heat transfer model for estimating the heat transfer between the temperature altering means and the fluid to get an accurate estimate of the amount of energy transferred from or to the fluid. Such an estimate may be achieved using the most recent value of the control signal as an input variable because this can be used to give an accurate estimate of the energy state of the temperature altering means.

The invention thus provides a system for changing the temperature of a fluid where temperature sensor may be avoided altogether, thus avoiding any of the aforementioned drawbacks of using hardware sensors.

However, in an embodiment, the conduit comprises at least one temperature sensor for providing temperature feedback to the temperature estimation program. This feedback can be used to calibrate the heat transfer model employed by the temperature estimation program. This is particularly advantageous in situations where the system is subjected to changes in ambient conditions that cannot be accurately predicted by the heat transfer model.

In case the temperature altering means are located inside the conduit, the program may be arranged to estimate the fluid temperature by including an estimate of the heat transfer between the fluid and a medium external to the conduit through the conduit wall to further improve the accuracy of the fluid temperature estimate.

For temperature adjusting means comprising a temperature adjusting element covered by a multi-layered structure, the accuracy of the estimated heat transfer between the fluid and the external medium may be further improved by combining the estimated heat transfer between the temperature adjusting element and an inner layer of the multi-layered structure, the estimated heat transfer between neighboring layers of the multi-layered structure; and the estimated heat transfer between the outermost layer of the multi-layered structure and the fluid.

The accuracy of the heat transfer estimate may be further improved if the program is arranged to use at least one fluid relating parameter selected from a group comprising the first temperature and flow rate of the fluid through the conduit as an input variable. This is particularly advantageous if such fluid relating parameters exhibit non-negligible variation over a period of time.

The heat transfer estimation program may be further arranged to take other aspects of the system affecting the heat transfer between the fluid and the conduit into consideration. For instance, the conduit may comprise a coil for mixing the fluid, wherein the program is arranged to calculate the heat transfer between the temperature adjusting means and the combination of the fluid and the coil. This further improves the accuracy of the temperature estimate.

Preferably, the temperature adjusting means are arranged to be switched on or off during a zero crossing of an alternating mains current to reduce the risk of occurring voltage variations on the mains that may lead to e.g. flicker effects. In this case, the processor is preferably arranged to provide an estimate of the fluid temperature in a selected location in the conduit and to provide the controller with said estimate in between two contiguous zero crossings such that the temperature estimate can be updated during each switching cycle of the temperature adjusting means, thus yielding a fine-grained temperature control mechanism.

The program may be arranged to estimate the respective fluid temperatures in a plurality of locations of the conduit. This further improves the temperature control accuracy of the system, especially in cases where the temperature variation of the fluid through the conduit is not linear or in cases where the conduit comprises multiple stages, in which case a temperature estimate may be provided for a location in each stage, e.g. at the stage input and/or output.

Typically, the controller is arranged to calculate a demand for the temperature adjusting means from the one or more temperatures estimated by the processor.

The program running on the processor of the system of the present invention implements the method of the present invention, comprising estimating the fluid temperature in a selected location in the conduit by estimating the heat transfer between the fluid and the conduit; and providing a control signal to the temperature altering means in response to the estimated fluid temperature and the various other advantageous embodiments discussed above.

The program that implements the method of the present invention may be provided on a computer-readable storage medium such as a DVD, CD-ROM, memory stick and so on, including a remotely accessible storage medium such as a hard disk of a server accessible via the internet.

Additional features and advantages are described herein, and will be apparent from the following Detailed Description and the figures.

BRIEF DESCRIPTION OF THE FIGURES

The invention is described in more detail and by way of non-limiting examples with reference to the accompanying drawings, wherein.

DETAILED DESCRIPTION

Figure 1:
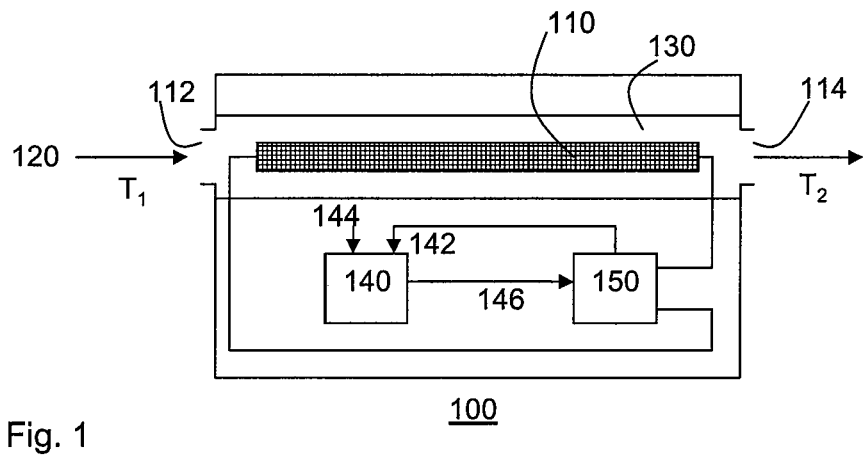
FIG. 1 schematically depicts an embodiment of a system of the present invention.

It should be understood that the Figures are merely schematic and are not drawn to scale. It should also be understood that the same reference numerals are used throughout the Figures to indicate the same or similar parts.

FIG. 1 shows a schematic representation of a system 100 according to the present invention. The system 100 comprises a conduit 110 having an inlet 112 and an outlet 114 and comprises a temperature adjusting element 130 such as a heating element or a cooling element for adjusting the temperature of a fluid entering the conduit 110 at inlet 112 at a temperature $T_1$ to a temperature $T_2$ at the outlet 114. The system 100 comprises a controller 150 for controlling the temperature adjusting element 130. The controller typically regulates the required demand for the temperature adjusting element 130 to ensure that the required output temperature T2 is achieved as accurately as possible.

The system 100 further comprises a processor 140 for providing the controller with a control signal 146. The processor 140 may be implemented in any known suitable way, such as a dedicated microcontroller or a multi-purpose central processing unit, and so on. The controller 150 may be implemented by the processor 140, or may be realized separately. The processor 140 generates the control signal 146 using a program for estimating the temperature of the fluid in a predefined location of the conduit 110. This may be at the outlet 114, in which case the estimated temperature is the outlet temperature $T_2$, or at an intermediate location inside the conduit 110. The processor 140 may estimate respective fluid temperatures at different locations in the conduit 110, such as at one or more intermediate locations and at the outlet 114. To this end, the program utilizes a model description of the conduit 110 and the temperature adjusting means 130, and comprises algorithms for estimating the heat transfer between the fluid 120 and the various parts of the conduit 110 including the temperature adjusting means 130.

The program typically estimates the heat transfer between the conduit 110 including the temperature adjusting means 130 and the fluid 120 using one or more time-dependent variables, which may be received on the inputs 142 and 144 of the processor 140. For instance, the controller 150 may calculate a load for the temperature adjusting means 130 from the control signal 146 received from the processor 140, and may generate a further control signal forcing the temperature adjusting means 130 to assume the calculated load. The further control signal may be fed back to the processor 140 via input 142. In addition, the processor 140 may receive time-dependent fluid relating parameter values on its input 144 such as a fluid input temperature $T_1$ and a fluid flow rate through the conduit 110. The temperature $T_1$ may be measured using a temperature sensor (not shown). This sensor is less likely to suffer from the aforementioned problems addressed by the present invention because the temperature $T_1$ typically exhibits only small variations, and varies much more slowly than for instance temperature $T_2$. In fact, in cases where the variations in $T_1$ are sufficiently small, $T_1$ may be implemented in the algorithm of the temperature estimating program as a constant. Similarly, the fluid flow rate may be implemented as a constant if the flow rate through the conduit 110 does not change (significantly). The variables used by the temperature estimating program are not limited to the above examples; other fluid or conduit relating parameters may also be used.

The heat transfer model used by the temperature estimating program of the system 100 will now be described in more detail. In this description, the system 100 will be described as an on-demand water heater (ODH), which is a preferred embodiment of the system 100. It should however be appreciated that the fluid 120 does not need to be water; other fluids are equally feasible. Moreover, it should be appreciated that the temperature adjusting means 130 do not need to be a heating element, but may also be a cooling element. Also, the temperature adjusting means 130 do not necessarily have to be located inside the conduit 110; they may also be located in or around the conduit wall.

The mathematical model for the temperature estimating program of the ODH is based on a physical model for thermal flow between materials. Heat will always tend to flow from a hot material to a cooler material until thermal equilibrium is achieved. Hence, the energy transfer between materials may be calculated. This transfer function determines the temperature of the materials over time. In other words, this model can be used to predict the output temperature $T_2$ of the water at a specific flow rate at a specific time.

Figure 2:
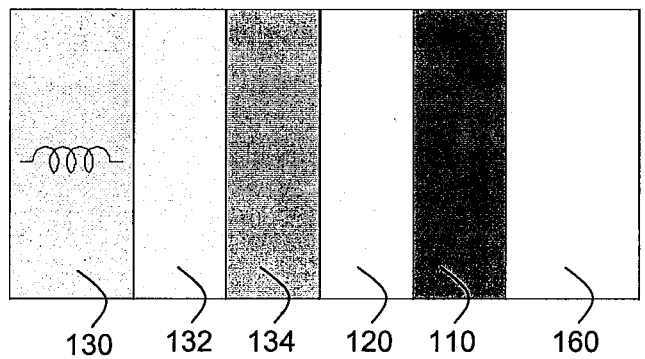
FIG. 2 schematically depicts a model of a conduit of the system of the present invention.
Figure 3:
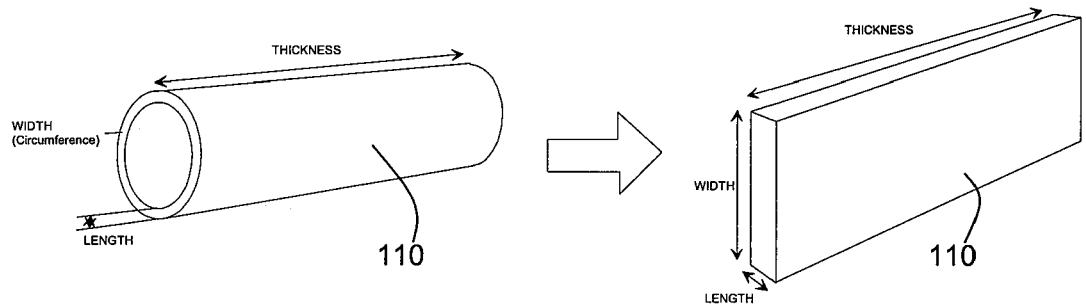
FIG. 3 schematically depicts a heat transfer model approach for an embodiment of a system of the present invention.

The basic physical structure of the system 100 comprises a radial conduit 110, which has two coil heater elements 130 at its centre. The coil heater elements are embedded in and surrounded by a magnesium oxide (MgO) ceramic layer 132. This layer is surrounded by an inner steel wall 134. The fluid 120, i.e. water in this example, flows around this inner steel wall 134 and is contained within the system 100 by an outer wall of steel or another suitable material. This outer wall comprises the conduit 110. The outer wall is exposed to the outside environment 160, e.g. to air. The physical structure of the radial heater can be simplified for calculation as shown in FIG. 2, with the heater 130 on the far left (energy input) and the outside environment 160 on the far right. FIG. 3 shows how the radial inner steel wall 134 can be modeled by a flat slab of material for calculation and simulation purposes. It will be appreciated that such a model may also be used for other parts of the system 100, e.g. the wall of the conduit 110.

Heat transfer or thermal flow between neighboring materials can be calculated over a period of time by determining the amount of energy gained or lost by a material during a specific time step, i.e. during a predefined unit of time. This energy exchange is equal to the mass of the substance (m [Kg]) multiplied by its specific heat capacity (SHC [JKg$^{-1}$K$^{-1}$]) multiplied by its change of temperature (final temperature−initial temperature [K]) as shown in equation 1:

$$E = m \cdot SHC \cdot (T_f - T_i) \quad (1)$$

The specific heat capacity of a material is a measure of its ability to store heat as it changes in temperature. The material also gives up energy; this is defined by the loss factor (equation 2) and is based on the dimensions of the material and its thermal conductivity. The factor ½ is introduced as a simplification and allows the calculation of the energy transfer from the midpoint of one material to its neighboring material.

$$\text{Loss\_factor} = \frac{\text{length}}{2 \cdot \text{Thermal\_Conductivity} \cdot \text{thickness} \cdot \text{width}} \quad (2)$$

| | |
|---|---|
| E | Energy change in material [J] |
| Loss_Factor | Loss factor of material [KW$^{-1}$] |
| $T_i$ | Initial temperature of material [K] |
| $T_f$ | Final temperature of material [K] |
| $\Delta t$ | Predefined time unit [s] |

Figure 4:
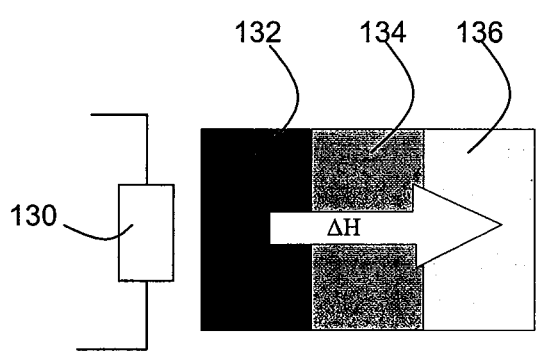
FIG. 4 schematically depicts a heat transfer model for a multi-layered material.

Consider the simple heat transfer model shown in FIG. 4. When the heating element 130 has been inactive for a sufficiently long time period, the materials 132, 134 and 136 exhibit an equilibrium 'ambient' temperature. If energy is dissipated by the heating element 130, i.e. it is switched on, energy transfer takes place: the heat energy flows from the hottest material to the coolest material. The temperature and energy within each material can be calculated over a number of time steps using the following algorithm, in which equation 1 is rearranged to arrive at equation 4:

$$T_f = \frac{E}{m \cdot SHC} + T_i \Rightarrow T_f = \frac{E}{mc} + T_i \quad (4)$$

In which mc[JK$^{-1}$]=Heat Capacity=m[Kg]×SHC[JKg$^{-1}$K$^{-1}$].

This yields the following algorithm for the layered system shown in FIG. 2:

Determine ambient material temperature. This may be done using a sensor or by means of assuming a constant value for the ambient temperature.

Determine energy $E_{Heater}$ in heating element 130 for time step $\Delta t$ $E_{Heater}$=number of heat quanta consumed by the heating element 130 in time step $\Delta t$ The number of heat quanta may be explicitly provided by the controller 150. Alternatively, the controller 150 may simply indicate if the heating element 130 is switched on or off, or the exact amount of load applied, which may be translated by the processor 140 into a number of heat quanta, for instance by using a conversion function or a look-up table.

Calculate temperature of the heating element 130 using equation 5, wherein subscript M1 indicates material 132, and subscript (t−1) indicates previous time step.

$$T_{Heater} = \frac{E_{Heater} - E_{M1}}{mc_{M1}} + T_{M1_{(t-1)}} \quad (5)$$

Calculate energy transfer between material 130-132 (M1) using equation 6:

$$E_{M1} = \frac{\Delta t}{\text{Loss\_factor}_{M1}} \cdot (T_{Heater_{(t-1)}} - T_{M1_{(t-1)}}) \quad (6)$$

Calculate temperature in material 132 (M1) using equation 7:

a. $$T_{M1} = \frac{E_{M1} - E_{M2}}{mc_{M1}} + T_{M1_{(t-1)}} \quad (7)$$

Calculate energy transfer between material 132 to 134 (M2 in equation 8)

b. $$E_{M2} = \frac{\Delta t}{\text{Loss\_factor}_{M1} + \text{Loss\_factor}_{M2}} \cdot (T_{M1_{(t-1)}} - T_{M2_{(t-1)}}) \quad (8)$$

Calculate temperature in material 134 (M2 in equation 9)

$$c.\ T_{M2} = \frac{E_{M2} - E_{M3}}{mc_{M2}} + T_{M2_{(t-1)}} \qquad (9)$$

Calculate energy transfer between material 134 and 136 (M3 in equation 10)

$$d.\ E_{M3} = \frac{\Delta t}{\text{Loss\_factor}_{M2} + \text{Loss\_factor}_{M3}} \cdot (T_{M2_{(t-1)}} - T_{M3_{(t-1)}}) \qquad (10)$$

Calculate temperature in material 136 (M3 in equation 11)

$$e.\ T_{M3} = \frac{E_{M3} - E_{M2}}{mc_{M3}} + T_{M3_{(t-1)}} \qquad (11)$$

and so on. Consequently, the temperature of every physical element of the heating element 130 can be evaluated at any time.

The above algorithm deals with a heating element 130 supplying energy into a number (e.g. three) adjacent or neighboring materials. In such a heating system, the materials will continue to heat up as long as the amount of energy introduced into the heating element 130 keeps increasing. The choice of three material layers is by way of non-limiting example only. The model may include fewer material layers. Alternatively, this model may of course be extended to include the remaining parts of the heat transfer system, such as the water volume 120, the conduit 110 and the external environment 160. The parameters of the heat transfer function involving the external environment may be obtained experimentally. Typically, heat energy is being drawn away from the heating element 130 by the water 120 and external environment 160. It is pointed out that the heat loss to the external environment 160 may be ignored if this is sufficiently small, for instance in the case of an insulated conduit 110.

The mathematical model of the temperature estimating program may further consider temperature gradients introduced by the flow of water through the conduit 110. The water flow causes a 'cooling' effect on the heating element 130. The model determines a 'variable volume factor' from the water flow rate, volume of conduit 110 and the size of the time step Δt, as shown in equation 12:

$$\text{variable\_vol\_factor} = \frac{\text{Flowrate} \cdot \text{Tick\_size}}{\text{heater\_volume}} \qquad (12)$$

wherein Tick_size is the predefined time interval Δt, and the following units are used for the variables in equation 12:

| | |
|---|---|
| Variable vol factor | 1 |
| Tick size | s |
| Heater volume | 1 |
| Flowrate | 1 s$^{-1}$ |

Figure 5:
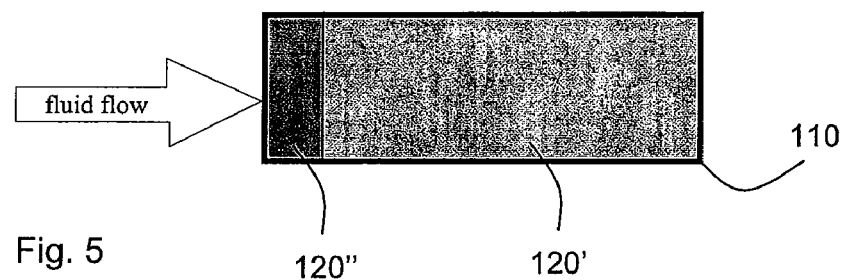
FIG. 5 schematically depicts a temperature estimation approach for embodiment of a system of the present invention.

The flow rate may for instance be measured using a flow rate meter (not shown in FIG. 1). As demonstrated in FIG. 5, for each time interval Δt, a fraction 120" of the water volume in the conduit 110 is replaced with 'fresh', i.e. unheated water, at ambient temperature. The temperature within the conduit 110 thus decreases slightly according to the size (volume) of the fraction 120" at each interval Δt. The temperature of the water fraction 120' already present in the conduit 110 is estimated using equation 13:

$$T_{water\_heated} = \qquad (13)$$
$$\left[T_{water_{(t-1)}} + \frac{(E_{water} - E_{outer\_wall})}{mc_{water}}\right] \cdot (1 - \text{variable\_vol\_factor})$$

whereas the temperature of water fraction 120" is estimated using equation 14:

$$T_{water\_inlet} = (\text{inlet\_temp} \cdot \text{variable\_vol\_factor}) \qquad (14)$$

Equations 13 and 14 may be combined to provide an estimate of the average water temperature inside the conduit 110 for a specific time step Δt, as shown in equation 15:

$$T_{water} = T_{water\_heated} + T_{water\_inlet} \qquad (15)$$

The influx of unheated water 120 via inlet 112 has the effect of reducing the average water temperature within the conduit 110 for each time step Δt. Equations 12-15 demonstrate that this model is capable of describing the water temperature at specific locations within the conduit 110 when subject to a water flow through the conduit 110 such that water passes through the conduit 110 in a plurality of time intervals Δt (i.e. more than one time interval Δt).

The system reaches equilibrium when the heat effectively transferred from the heating element 130 to the water 120 is equal to the heat loss by the flow of water, i.e. water volume, leaving the conduit 110 at outlet 114 and the heat loss to the external surroundings 160.

The water temperature estimating algorithm may be further refined to take optional additional features of the conduit 110 into consideration. For instance, the conduit 110 may include a spring coil within the water channel for the purpose of mixing the water as it travels through the conduit 110. Analysis of experimental results has demonstrated that this coil spring effectively alters the heat capacity of the water by a factor related to the occupied volume of the spring within the conduit 110.

The temperature estimating algorithm may factor in a percentage value for the volume of the spring within the water channel of the conduit 110. In other words, the water channel volume is occupied by both water as well as the steel spring. Typically, the combined SHC of the spring and water is different to that of water alone. The SHC of the water channel can thus be adjusted to take into consideration the different mass and SHC of the steel spring within the water channel.

The combined SHC of water and spring can be calculated as shown in equation 16:

$$SHC_{water\&spring} = (1 - \text{spring \%}) \cdot SHC_{water} + \text{spring \%} \cdot SHC_{steel\_spring} \qquad (16)$$

The loss-factor is also adjusted in calculating the energy in the water/spring medium as shown in equation 10.

$$E_{water} = \qquad (17)$$
$$\frac{\Delta t}{\text{Loss\_factor}_{inner\_wall} + \text{Loss\_factor}_{water}} \cdot (T_{inner\_wall_{(t-1)}} - T_{water_{(t-1)}})$$

It will be appreciated that other modifications to the conduit 110 may be modeled in a similar fashion.

The heat transfer model may be further refined by incorporating temperature sensors in the system of the present invention. The output of the temperature sensors may be used as calibration data for the heat transfer model. This is particularly useful in situations where the heat transfer model only approximates the real system, such as in situations where real-time changes to the system, such as ambient system temperature, cannot be accurately predicted. To this end, the temperature sensors take readings at predefined time intervals, such as every few seconds, with the temperature estimation program using these readings to recalibrate appropriate parameters in its heat transfer model. This way, it can be ensured that the heat transfer model accurately predicts the fluid temperature over prolonged periods of time. The temperature sensors can also be used to check if the means for altering the temperature of the fluid are out of order: for example, if a temperature sensor placed at the outlet for delivering the fluid indicates that the temperature is almost equivalent to the temperature at the inlet for receiving the fluid or quite inferior to the estimated temperature of the fluid, it means that the means for altering the temperature do not work. The temperature sensors can also be used to check if fluid is missing in the system: for example, if the temperature is quite superior to the estimated temperature of the fluid, it means that the means for altering the temperature are no more fed with a sufficient flow of fluid; the water tank is for example empty.

It will be appreciated that such a mixed system comprises distinct advantages over a system controlled by temperature sensors only, because the temperature estimation program provides a more accurate monitoring of rapid fluid temperature changes, with the relatively slow temperature sensors primarily being used to reduce or avoid drift in the calibration of the temperature estimation program.

A fluid temperature adjusting system 100 typically presents a relatively large load. Such loads can cause noticeable voltage variations on mains alternating current (AC) supply, which can lead to observable flicker in light sources connected to the AC mains. A known good design practice to limit the amount of flicker on the mains dictates that such a load is only switched on during a zero crossing of the mains AC cycle. Consequently, the temperature adjusting element 130 can only be switched on or off every 10 ms for a 50 Hz AC mains supply, or any other suitable frequency e.g. 60 Hz.

Figure 6:
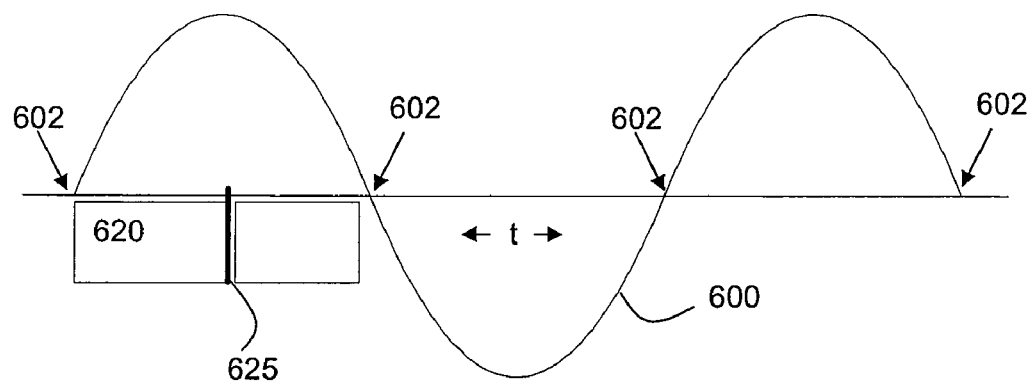
FIG. 6 schematically depicts a timing diagram for a possible implementation of the program of an embodiment of the system of the present invention.

FIG. 6 shows a preferred embodiment of the duty cycle of the system 100 with respect to the mains AC cycle 600 having zero crossings 602. The processor 140 is arranged to perform the temperature estimation of the fluid temperature in a selected location in the conduit 110 during time interval 620. The processor 140 typically estimates the fluid temperature at the next zero crossing 602. Upon completion of the estimation, as indicated by line 625, the controller 150 is provided with a control signal 146, which provides the controller 150 with an indication of the estimated temperature. The controller 150 subsequently calculates the load to be applied to the temperature adjusting element 130 at the next zero crossing 602 as a function of the control signal 146. This may be the determination of the amount of a variable load, or may be a binary switch on/off decision.

The processor 140 should have sufficient computational power to ensure that the control signal 146 is provided in time for the controller 150 to complete the calculation of the load before the arrival of the next zero crossing 602. This may for instance be realized by using a high end digital signal processor 140.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for changing the temperature ($T_1$) of a fluid, comprising:
   an inlet for receiving the fluid, the fluid being at a first temperature ($T_1$);
   an outlet for delivering the fluid;
   a conduit for transporting the fluid from the inlet to the outlet, the conduit comprising means for altering the temperature of the fluid from the first temperature ($T_1$) to a second temperature ($T_2$);
   a processor comprising a temperature estimating program for estimating the fluid temperature in a selected location of the conduit based on an estimate of the heat transfer between the fluid and the conduit; and
   a controller for providing a control signal to the means for altering the temperature in response to the estimated fluid temperature.

2. The system as claimed in claim 1, wherein the program comprises a heat transfer model for estimating the heat transfer between the means for altering the temperature and the fluid.

3. The system as claimed in claim 2, wherein the program estimates the heat transfer between the means for altering the temperature and the fluid using a most recent value of the control signal as an input variable.

4. The system as claimed in claim 1, wherein the program uses at least one fluid relating parameter selected from the group consisting of the first temperature ($T_1$) and flow rate of the fluid through the conduit as an input variable.

5. The system as claimed in claim 1, wherein the controller calculates a load for the means for adjusting temperature from the one or more temperatures estimated by the processor.

6. The system as claimed in claim 1, wherein the fluid is water and the means for adjusting temperature comprise a heating element.

7. The system as claimed in claim 1, wherein the heat transfer model includes heat loss.

8. The system as claimed in claim 1, wherein the system comprises at least one temperature sensor for measuring the temperature of the fluid, the temperature sensor provides the temperature estimation program with a temperature reading.

9. A method for controlling a system for changing the temperature of a fluid, the method comprising:
   providing an inlet for receiving the fluid at a first temperature ($T_1$);
   providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$);

estimating the fluid temperature in a selected location of the conduit by estimating the heat transfer between the fluid and the conduit; and providing a control signal to the means for altering temperature in response to the estimated fluid temperature.

10. The method as claimed in claim 9, wherein the step of estimating the fluid temperature comprises estimating the heat transfer between the means for altering the temperature and the fluid using a heat transfer model.

11. The method as claimed in claim 10, wherein the step of estimating the fluid temperature comprises estimating the temperature using the most recent value of the control signal as an input variable.

12. The method as claimed in claim 10, comprising:
measuring a temperature of the fluid inside the system; and
adjusting the heat transfer model based on the measured temperature.

13. The method as claimed in claim 9, comprising using at least one fluid relating parameter from a group comprising the first temperature ($T_1$) and flow rate of the fluid through the conduit as an input variable for estimating said temperature.

14. The method as claimed in claim 9, comprising calculating a load for the means for adjusting the temperature from the one or more estimated temperatures.

15. An computer-readable storage medium comprising a program implementing a method for controlling a system for changing the temperature of a fluid, the method comprising:
providing an inlet for receiving the fluid at a first temperature ($T_1$);
providing an outlet for delivering the fluid at a second temperature ($T_2$);
providing a conduit for transporting the fluid from the inlet to the outlet, the conduit comprising means for altering the temperature of the fluid from the first temperature ($T_1$) to the second temperature ($T_2$);
estimating the fluid temperature in a selected location of the conduit by estimating the heat transfer between the fluid and the conduit; and
providing a control signal to the temperature altering means in response to the estimated fluid temperature for use with the system, the program comprising an algorithm for estimating the fluid temperature in a selected location of the conduit based on an estimate of the heat transfer between the fluid and the conduit.

16. The computer-readable storage medium as claimed in claim 15, wherein the algorithm estimates the heat transfer between the means for altering the temperature and the fluid.

17. The computer-readable storage medium as claimed in claim 15, wherein the algorithm estimates the temperature using the most recent value of the control signal as an input variable.

18. A system for changing the temperature of a fluid, comprising:
an inlet for receiving the fluid at a first temperature;
an outlet for delivering the fluid;
a conduit for transporting the fluid from the inlet to the outlet, the conduit comprising a device for heating the fluid from the first temperature ($T_1$) to a second temperature ($T_2$);
a processor comprising a program for estimating the fluid temperature in a selected location of the conduit based on an estimate of the heat transfer between the fluid and the conduit; and
a controller for providing control of the device for heating the fluid in response to the estimated fluid temperature.

19. A system for changing the temperature ($T_1$) of a fluid, comprising:
an inlet for receiving the fluid, the fluid being at a first temperature ($T_1$);
an outlet for delivering the fluid;
a conduit for transporting the fluid from the inlet to the outlet, the conduit comprising means for altering the temperature of the fluid from the first temperature ($T_1$) to a second temperature ($T_2$);
a processor comprising a temperature estimating program for estimating the fluid temperature in a selected location of the conduit based on an estimate of the heat transfer between the fluid and the conduit, wherein the program comprises a heat transfer model for estimating the heat transfer between the means for altering the temperature and the fluid, wherein the means for altering the temperature is located inside the conduit, and wherein the program estimates the fluid temperature by including an estimate of the heat transfer between the fluid and a medium external to the conduit through the conduit wall; and
a controller for providing a control signal to the means for altering the temperature in response to the estimated fluid temperature.

20. A system for changing the temperature ($T_1$) of a fluid, comprising:
an inlet for receiving the fluid, the fluid being at a first temperature ($T_1$);
an outlet for delivering the fluid;
a conduit for transporting the fluid from the inlet to the outlet, the conduit comprising means for altering the temperature of the fluid from the first temperature ($T_1$) to a second temperature ($T_2$);
a processor comprising a temperature estimating program for estimating the fluid temperature in a selected location of the conduit based on an estimate of the heat transfer between the fluid and the conduit, wherein the program comprises a heat transfer model for estimating the heat transfer between the means for altering the temperature and the fluid, and wherein the program estimates the heat transfer between the means for altering the temperature and the fluid using a most recent value of the control signal as an input variable; and
a controller for providing a control signal to the means for altering the temperature in response to the estimated fluid temperature, wherein the means for altering the temperature comprises a multi-layered structure surrounding a temperature adjusting element, and the program is arranged to estimate the heat transfer between the fluid and the means for altering the temperature by combining:
the estimated heat transfer between the means for altering the temperature and an inner layer of the multi-layered structure;
the estimated heat transfer between neighboring layers of the multi-layered structure; and
the estimated heat transfer between the outermost layer of the multi-layered structure and the fluid.

21. A system for changing the temperature ($T_1$) of a fluid, comprising:
an inlet for receiving the fluid, the fluid being at a first temperature ($T_1$);
an outlet for delivering the fluid;

a conduit for transporting the fluid from the inlet to the outlet, the conduit comprising means for altering the temperature of the fluid from the first temperature ($T_1$) to a second temperature ($T_2$);

a processor comprising a temperature estimating program for estimating the fluid temperature in a selected location of the conduit based on an estimate of the heat transfer between the fluid and the conduit, wherein the program comprises a heat transfer model for estimating the heat transfer between the means for altering the temperature and the fluid, wherein the conduit comprises a mixer for mixing the fluid, and the program calculates the heat transfer between the means for altering the temperature and the combination of the fluid and the mixer; and a controller for providing a control signal to the means for altering the temperature in response to the estimated fluid temperature.

22. A system for changing the temperature ($T_1$) of a fluid, comprising:

an inlet for receiving the fluid, the fluid being at a first temperature ($T_1$);

an outlet for delivering the fluid;

a conduit for transporting the fluid from the inlet to the outlet, the conduit comprising means for altering the temperature of the fluid from the first temperature ($T_1$) to a second temperature ($T_2$);

a processor comprising a temperature estimating program for estimating the fluid temperature in a selected location of the conduit based on an estimate of the heat transfer between the fluid and the conduit; and a controller for providing a control signal to the means for altering the temperature in response to the estimated fluid temperature, wherein the means for altering the temperature switches on or off during a zero crossing of an alternating mains current and the processor estimates the fluid temperature in the selected location in the conduit and provides the controller with the estimate in between two contiguous zero crossings.

23. A system for changing the temperature ($T_1$) of a fluid, comprising:

an inlet for receiving the fluid, the fluid being at a first temperature ($T_1$);

an outlet for delivering the fluid;

a conduit for transporting the fluid from the inlet to the outlet, the conduit comprising means for altering the temperature of the fluid from the first temperature ($T_1$) to a second temperature ($T_2$);

a processor comprising a temperature estimating program for estimating the fluid temperature in a selected location of the conduit based on an estimate of the heat transfer between the fluid and the conduit, wherein the program estimates respective fluid temperatures in a plurality of locations of the conduit; and a controller for providing a control signal to the means for altering the temperature in response to the estimated fluid temperature.

24. A method for controlling a system for changing the temperature of a fluid, the method comprising:

providing an inlet for receiving the fluid at a first temperature ($T_1$);

providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$), wherein the means for altering the temperature are located inside the conduit;

estimating the fluid temperature in a selected location of the conduit by estimating the heat transfer between the fluid and the conduit, wherein estimating the fluid temperature comprises estimating the heat transfer between the means for altering the temperature and the fluid using a heat transfer model;

estimating the fluid temperature by including the heat transfer between the fluid and a medium external to the conduit through the conduit wall; and providing a control signal to the means for altering temperature in response to the estimated fluid temperature.

25. A method for controlling a system for changing the temperature of a fluid, the method comprising:

providing an inlet for receiving the fluid at a first temperature ($T_1$);

providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$), wherein the means for altering the temperature comprise a multi-layered structure surrounding a temperature adjusting element;

estimating the fluid temperature in a selected location of the conduit by estimating the heat transfer between the fluid and the conduit, wherein estimating the fluid temperature comprises estimating the heat transfer between the means for altering the temperature and the fluid using a heat transfer model;

estimating the heat transfer between the means for adjusting the temperature and the fluid by estimating the heat transfer between the means for altering the temperature and an inner layer of the multi-layered structure, estimating the heat transfer between neighboring layers of the multi-layered structure, estimating the heat transfer between the outermost layer of the multi-layered structure and the fluid, and combining the estimations; and providing a control signal to the means for altering temperature in response to the estimated fluid temperature.

26. A method for controlling a system for changing the temperature of a fluid, the method comprising:

providing an inlet for receiving the fluid at a first temperature ($T_1$);

providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$), wherein the conduit comprises a mixer for mixing the fluid;

estimating the fluid temperature in a selected location of the conduit by estimating the heat transfer between the fluid and the conduit, wherein estimating the fluid temperature comprises estimating the heat transfer between the means for altering the temperature and the fluid using a heat transfer model;

calculating the heat transfer between the means for altering the temperature and the combination of the fluid and the mixer; and providing a control signal to the means for altering temperature in response to the estimated fluid temperature.

27. A method for controlling a system for changing the temperature of a fluid, the method comprising:

providing an inlet for receiving the fluid at a first temperature ($T_1$);

providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$);

estimating the fluid temperature in a selected location of the conduit by estimating the heat transfer between the fluid and the conduit;

providing a control signal to the means for altering temperature in response to the estimated fluid temperature;

switching the means for altering the temperature during a zero crossing of an alternating mains current; and a combined step of estimating the fluid temperature in the selected location of the conduit and providing the controller with said estimate during a time interval in between two contiguous zero crossings.

28. A method for controlling a system for changing the temperature of a fluid, the method comprising:

providing an inlet for receiving the fluid at a first temperature ($T_1$);

providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$);

estimating the fluid temperature in a selected location of the conduit by estimating the heat transfer between the fluid and the conduit; and providing a control signal to the means for altering temperature in response to the estimated fluid temperature; and estimating respective fluid temperatures in a plurality of locations of the conduit.

29. A computer-readable storage medium comprising a program implementing a method for controlling a system for changing the temperature of a fluid, the method comprising:

providing an inlet for receiving the fluid at a first temperature ($T_1$);

providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$);

estimating the fluid temperature in a selected location of the conduit by estimating the heat transfer between the fluid and the conduit; and providing a control signal to the temperature altering means in response to the estimated fluid temperature for use with the system, the program comprising an algorithm for estimating the fluid temperature in a selected location of the conduit based on an estimate of the heat transfer between the fluid and the conduit, wherein the algorithm estimates the fluid temperature by including the heat transfer between the fluid and a medium external to the conduit through the conduit wall.

30. A computer-readable storage medium as claimed in claim 29, wherein the means for adjusting the temperature comprise a multi-layered structure surrounding a temperature adjusting element, and the program estimates the heat transfer between the fluid and the means for adjusting the temperature by combining:

the estimated heat transfer between the temperature adjusting element and an inner layer of the multi-layered structure;

the estimated heat transfer between neighboring layers of the multi-layered structure; and the estimated heat transfer between the outer layer of the multi-layered structure and the fluid.

31. A computer-readable storage medium comprising a program implementing a method for controlling a system for changing the temperature of a fluid, the method comprising:

providing an inlet for receiving the fluid at a first temperature ($T_1$);

providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$);

estimating the fluid temperature in a selected location of the conduit by estimating the heat transfer between the fluid and the conduit; and providing a control signal to the temperature altering means in response to the estimated fluid temperature for use with the system, the program comprising an algorithm for estimating the fluid temperature in a selected location of the conduit based on an estimate of the heat transfer between the fluid and the conduit, wherein the algorithm estimates the heat transfer between the means for altering the temperature and the combination of the fluid and a mixing coil in the conduit.

32. A computer-readable storage medium comprising a program implementing a method for controlling a system for changing the temperature of a fluid, the method comprising:

providing an inlet for receiving the fluid at a first temperature ($T_1$);

providing an outlet for delivering the fluid at a second temperature ($T_2$);

providing a conduit for transporting the fluid from the inlet to the outlet, the conduit comprising means for altering the temperature of the fluid from the first temperature ($T_1$) to the second temperature ($T_2$);

estimating the fluid temperature in a selected location of the conduit by estimating the heat transfer between the fluid and the conduit; and providing a control signal to the temperature altering means in response to the estimated fluid temperature for use with the system, the program comprising an algorithm for estimating the fluid temperature in a selected location of the conduit based on an estimate of the heat transfer between the fluid and the conduit, wherein the program estimates respective fluid temperatures in a plurality of locations of the conduit.

* * * * *